United States Patent [19]

Andrews

[11] Patent Number: 4,457,273

[45] Date of Patent: Jul. 3, 1984

[54] CONICAL PISTON AND CYLINDER HEAD IN INTERNAL COMBUSTION ENGINE

[76] Inventor: William V. Andrews, 5545 Lemon, Long Beach, Calif. 90805

[21] Appl. No.: 367,292

[22] Filed: Apr. 12, 1982

[51] Int. Cl.³ ............................................. F02B 23/00
[52] U.S. Cl. ............................... 123/193 P; 123/275; 123/661; 123/671
[58] Field of Search ............... 123/193 R, 193 P, 661, 123/671, 275

[56] References Cited

U.S. PATENT DOCUMENTS 1,660,424  2/1928  Mobersohn ......................... 123/275
2,672,135  3/1954  Kosche ................................. 123/671

FOREIGN PATENT DOCUMENTS 527117  7/1956  Canada ............................... 123/671
464842  8/1928  Fed. Rep. of Germany ...... 123/671
280827  11/1927  United Kingdom ............... 123/275

Primary Examiner—Craig R. Feinberg
Attorney, Agent, or Firm—Charles H. Thomas

[57] ABSTRACT

In an internal combustion engine a piston and a cylinder head defining a cylinder with a blind end thereatop are formed in a conical configuration. The piston compresses charges of an air/fuel mixture in the blind end of the cylinder, whereupon ignition of the fuel is initiated. Combustion of the fuel proceeds first from the region of ignition in the blind end of the cylinder and then along the interstitial space between the diverging conical walls of the cylinder head and piston. The expanding products of combustion squeeze the piston from the top and the sides, thereby transferring power smoothly and directly to the piston. The progress of combustion spreads equally both downwardly and radially outwardly from the axis of the piston, thereby providing an efficient transfer of power with a high fuel economy.

2 Claims, 2 Drawing Figures

CONICAL PISTON AND CYLINDER HEAD IN INTERNAL COMBUSTION ENGINE

BACKGROUND OF THE INVENTION

1. Field of the Invention

The present invention relates to a design of an internal combustion engine.

2. Description of the Prior Art

In internal combustion engines at least one piston is mounted for reciprocation within a cylinder head. The cylinder head defines a cylinder having a blind end at which fuel is compressed. Inlet and exhaust valves are located in communication with the cylinder and an ignition mechanism, such as a spark plug, is located at the blind end of the cylinder. The piston is coupled to a crankshaft by means of a piston rod which turns the crankshaft when the piston is propelled away from the blind end of the cylinder and toward the crankshaft.

Power is applied to the piston by the pressure exerted from the expanding products of combustion of a vaporized fuel in the cylinder and the blind end thereatop of the internal combustion engine. Prior to ignition, the vaporized fuel is compressed by the piston moving upwardly through the cylinder and into the blind end. As the piston approaches the end of its compression stroke the vaporized fuel is ignited in the presence of oxygen, creating combustion. The products of combustion tend to expand rapidly, thereby exerting a considerable force pushing the piston away from the blind end of the cylinder and toward the engine crankshaft. The force exerted on the piston is transferred to the piston rod, which is coupled to the crankshaft at a rotatable coupling displaced from the axis of the crankshaft. Once the piston reaches its closest approach to the crankshaft, remote from the blind end of the cylinder, it reverses its direction of movement and again approaches the blind end of the cylinder, exhausting the spent, expanded gases and vapors of combustion through a port theretofore blocked by an exhaust valve.

As the piston advances in the cylinder toward the blind end thereof, the exhaust valve is closed and an inlet valve is opened to admit uncombusted fuel and air. The inlet valve is open for only a short time to admit fuel, and then is closed. As the piston reaches its point of closest approach to the blind end of the cylinder at the termination of the compression stroke, the new charge of fuel is ignited and the cycle is repeated recurrently.

Various piston and cylinder head configurations have been designed to attempt to maximize the transfer of power from the fuel as it burns and to minimize the amount of fuel required to operate the internal combustion engine. However, none of the prior piston and cylinder head designs has employed the unique configuration of applicant's invention, nor the principle of operation thereof.

SUMMARY OF THE INVENTION

The present invention is an improvement in an internal combustion engine in which the end of a piston facing the blind end of a cylinder in a cylinder head is shaped as a cone. The walls of the cylinder head defining the blind end of the cylinder are likewise shaped in a corresponding conical configuration. The ignition chamber at the apex of the conical configuration has a cross sectional area which everywhere is no greater than the smallest cross sectional area of the conical portion of the blind end of the cylinder. Unlike other systems which have employed pistons having a frusto-conical configuration, the blind end of the cylinder in the cylinder head does not have a narrow throat so as to create a venturi effect.

In the operation of the improved internal combustion engine of the invention the charge of air and fuel mixture admitted through the inlet valve is compressed at the extremity of the blind end of the cylinder remote from the cylinder by the advancing conical shaped piston. As the conical piston reaches its closest approach toward the blind end of the cylinder, a charge of the air/fuel mixture is ignited by an ignition mechanism, such as a spark plug. The combustion of the charge of fuel progresses from the apex of the conical configuration radially outwardly from the axis of the piston and the cylinder and axially away from the apex of the conical walls of the cylinder head. Combustion proceeds in an expanding, toroidal pattern between the cylinder head walls and the conical surface of the end of the piston facing the blind end of the cylinder head of the invention. The effect of this pattern of combustion is to exert pressure down the sides of the piston so that the piston is squeezed from both the top and from the sides. This squeezing effect on the piston causes power to be transferred from the expanding products of combustion directly to the piston with greater fuel economy and less unburned fuel than in conventional internal combustion engines. As a consequence, the present invention constitutes an improved internal combustion engine which provides a more efficient transfer of power and a better fuel economy with fewer pollutants in the exhaust as contrasted with conventional internal combustion engines.

The invention may be described with greater clarity and particularity by reference to the accompanying drawings.

DESCRIPTION OF THE EMBODIMENT

Figure 1:
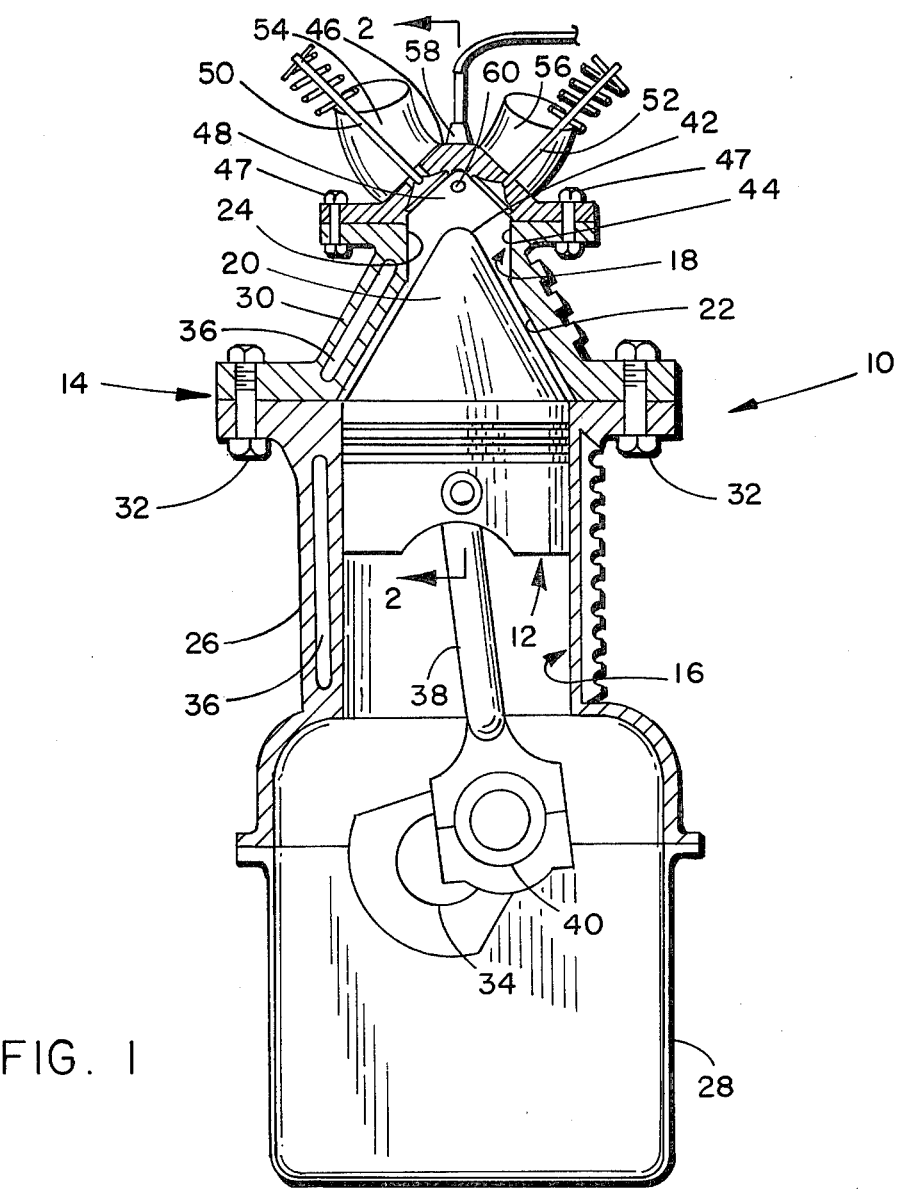
FIG. 1 is a side, elevational sectional view of one embodiment of the improved internal combustion engine of the invention.

In FIG. 1 an internal combustion engine 10 is depicted which employs at least one piston 12 mounted for reciprocation within a cylinder head 14. The cylinder head 14 defines a cylinder 16 and a blind end 18 for the cylinder 16. An air/fuel mixture is compressed within the blind end 18 in the cylinder head 14 and is ignited when the piston 12 is in the position depicted in FIG. 1.

Figure 2:
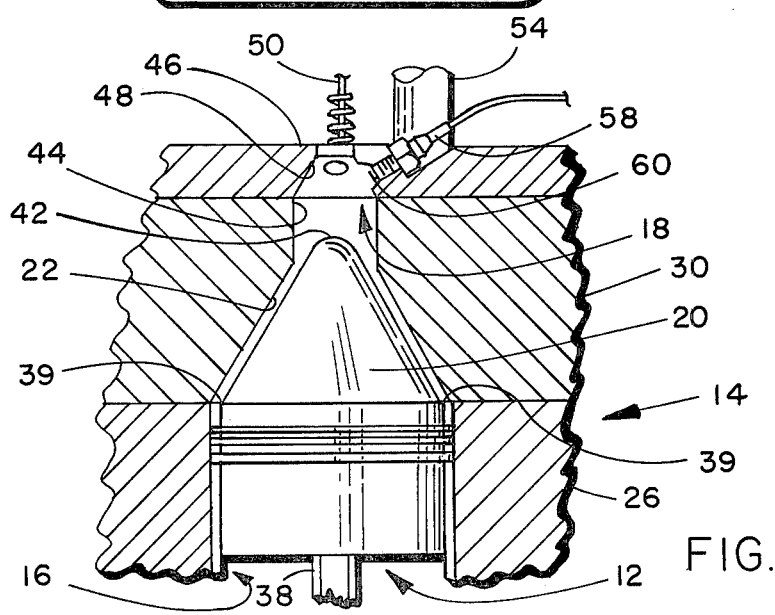
FIG. 2 is a sectional detail taken along the lines 2—2 of FIG. 1.

The surface of the end 20 of the piston 12 facing the blind end 18 of the cylinder 16 is configured as a cone, as illustrated both in FIG. 1 and in FIG. 2. The blind end 18 has a lower portion 22 atop the cylinder 16 which is shaped in a corresponding conical configuration. The lower, conical portion 22 of the blind end 18 culminates at its apex in an ignition chamber 24, the cross sectional area of which everywhere is no greater than the smallest cross section of the conical portion 22 of the blind end 18 of the cylinder 16.

As in conventional internal combustion engines, the cylinder head 14 of the internal combustion engine 10 is constructed with an engine block 26 positioned atop a concave, cup shaped oil pan 28. An engine block cover 30 surmounts the engine block 26 and is secured thereto by bolts 32. Bores through the engine block 26 aligned to intersect the axis of a crankshaft 34 define several cylinders 16.

Both the engine block 26 and the engine block cover 30 define cavities 36 adjacent to the walls of the cylinders 16 and blind ends 18 thereatop. Cooling fluid is pumped through the cavities 36 to cool the cylinder head 14.

The piston 12 is connected to the crankshaft 34 by a conventional piston rod 38 and a rotatable coupling 40 offset from the axis of the crankshaft 34. The lower portion of the piston 12 is of a conventional cylindrical configuration, but the surface of the upper end 20 has a right, circular conical configuration, preferably having a slope of between about 50° and about 78°. The upper end 20 preferably has a base of a slightly smaller diameter than the flat top of the cylindrical portion of the piston 12, thereby forming a small shoulder 39 between the conical upper end 20 and the lower cylindrical portion of the piston 12. The shoulder 39 enhances the pressure build-up of expanding gasses in the blind end 18 before they enter the cylinder 16, thereby improving the transfer of power to the piston 12. In a typical piston configuration according to the invention the cylindrical portion of the piston 12 has a diameter of about 3¾ inches. The apex 42 of the piston end 20 is rounded down about ½ inch to a distance of about 3¼ inches above the base of the conical piston end 20. The slope of the conical surface of the end 20 is inclined about 64° relative to the circular base of the cone at the top of the cylindrical portion of the piston 12.

The blind end 18 of the cylinder 16 is formed having a conical surface 22 which corresponds to the conical configuration of the end 20 of the piston 12. That is, the conical surface 22 has the same slope as the conical surface of the piston end 20.

The interior surface of the engine block cover 30 is only partially of a conical configuration. The conical surface 22 converges from the cylinder 16 and forms a cross sectional area perpendicular to the cylinder 16 which is greatest at the intersection of the blind end 18 and cylinder 16. From the cylinder 16, the conical surface 22 converges in a diminishing fashion and nowhere increases proceeding outwardly from the cylinder 16, along the axis thereof, away from the crankshaft 34. Near the remote extremity of the blind end 18 away from the cylinder 16 the interior surface of the engine block cover 30 narrows to a reduced diameter and forms a short, cylindrical surface 44. A cylinder head cap 46 is secured atop the engine block cover 30 by bolts 47 and has a concave conical recess defined in the underside surface 48 thereof. The slope of the conical recess defined by the downwardly facing surface 48 is 45° relative to the axis of the cylinder 16 and piston 12. The base of the conical surface 48 is equal to the diameter of the cylindrical interiorly facing surface 44 of the engine block cover 30.

The spring biased inlet valve 50 and a spring biased exhaust valve 52 are mounted at right angles to each other for reciprocal movement relative to the cylinder head cap 46. An inlet manifold 54 and an exhaust manifold 56 are located behind the inlet valve 50 and the exhaust valve 52, respectively, as viewed in FIG. 1. Communication from the inlet manifold 54 to the blind end 18 in the cylinder head 14 is established by a transverse channel in the cylinder head cap 46 when the inlet valve 50 is opened. Similarly, communication to the exhaust manifold 56 from the blind end 18 is established by a transverse channel when the exhaust valve 52 is opened. A spark plug 58 resides in communication with the blind end 18 by means of an inclined, tapped, sloping bore in the cylinder head cap 46, depicted in FIG. 2. The electrodes of the spark plug 58 are visible at 60 in FIGS. 1 and 2.

In the operation of the invention, the piston 12 moves reciprocally within the cylinder 16. The piston 12 moves from a position remote from the blind end 18 in a compression stroke toward the blind end 18. The exhaust valve 52 is open during the initial portion of the compression stroke, then is closed and the inlet valve 50 is in turn opened briefly and a charge of vaporized fuel and air is injected into the blind end 18 of the cylinder head 14. The inlet valve 50 is then closed as the piston 12 rises. The piston 12 compresses the vaporized charge of air and fuel until reaches its highest point in the blind end 18 of the cylinder head 14, as depicted in FIGS. 1 and 2. The spark plug 58 is thereupon activated by the induction coil of the engine and a spark at the spark plug electrodes 60 ignites the air/fuel mixture.

With the unique conical configuration of the surface 20 of the piston and the surface 22 of the cylinder head 14, the combustion of the air/fuel charge proceeds downwardly pushing against the conical surface 20 of the piston 12. Combustion advances evenly in a toroidal pattern down through the interstitial space between the conical surfaces 20 and 22 around the sides of the piston 12. The pressure of the exploding charge extends in all directions and down the sides of the piston 12 so that the piston is squeezed from the top and from the sides. This squeezing effect on the piston and the even distribution of force thereon provides a highly efficient transfer of power from the burning charge of vaporized fuel to the piston 12, and thence to the crankshaft 34. As a result, the improved engine of the invention achieves a high ratio of power utilization and extremely good fuel economy. Moreover, because combustion advances so evenly, less fuel is left unburned, thereby minimizing the amount of pollutants ejected through the exhaust manifold 56.

Undoubtedly numerous variations and modifications of the invention will become apparent to those familiar with internal combustion engines. Specifically, various slopes to the conical configurations of the surfaces 20 and 22 are possible. Also, the configuration of the portion of the blind end 18 of the cylinder block 18 above the conical surface 22 may be varied without departing from the scope of the invention. The positioning and arrangement of the inlet and exhaust valves and the spark plug may also be varied from the embodiment depicted to facilitate manufacture of the invention. Likewise, the structural components utilized to achieve the unique piston and cylinder head configuration may also be varied. Accordingly, the scope of the invention should not be construed as limited to the specific embodiment depicted in the drawings, but rather is defined in Claims appended hereto.

I claim:

1. In an internal combustion engine employing at least one piston mounted for reciprocation within a cylinder head defining a cylinder at a blind end of which fuel is compressed and ignited, the improvement wherein said piston having its length formed by a skirt section and a top end section extending along a majority of the length of said piston, said top end section facing said blind end of said cylinder and is configured as a complete cone extending upwardly from an outer periphery of said skirt section, and said blind end of said cylinder has downwardly extending therefrom a corresponding conical configuration portion culminating at its apex in an ignition chamber forming said cylinder, the cylinder having a cross sectional area of which everywhere is no greater than that of the conical portion extending from said blind end of said cylinder, and the top end section of said piston having a rounded apex which extends into said ignition chamber at top dead center of said engine during its compression stroke, and said piston and said conical portion extending from said blind end of said cylinder are of right circular conical configuration both having a slope of about sixty-four degrees.

2. In an internal combustion engine having a cylinder head defining at least one cylinder and a blind end thereatop, a piston mounted for reciprocation within a cylinder block to compress vaporized fuel at said blind end, and ignition means in said blind end for igniting said compressed fuel, the improvement wherein said blind end is formed by walls which are at least partially of a conical configuration portion converging from said cylinder block, and the blind end having a cross section which diminishes and nowhere increases in proceeding outwardly from said cylinder block along the axis thereof, and said piston having its length formed by a skirt section and a top end section along a majority of the length of said piston, said top end section facing said blind end of said cylinder and is configured as a full cone upwardly extending from an outer periphery of said skirt section and having a slope same as that of the conical configuration portion of said blind end in said cylinder head, and the slope of both said piston and the conical portion of said cylinder head is about sixty-four degrees, and the top end section of said piston having a rounded apex which extends into a narrowest portion of said blind end of said cylinder at top dead center of said engine during its compression stroke.

* * * * *